United States Patent [19]

Neuscheler

[11] 3,795,156
[45] Mar. 5, 1974

[54] SHIFTING LEVER FOR THE TRANSMISSION OF MOTOR VEHICLES

[76] Inventor: Wilhelm Neuscheler, Spitzholzstr. 113, 7032 Sindelfingen, Germany

[22] Filed: Dec. 15, 1971

[21] Appl. No.: 208,241

[30] Foreign Application Priority Data
Dec. 23, 1970 Germany............................ 2063371

[52] U.S. Cl..................... 74/523, 74/473 R, 74/543
[51] Int. Cl.............................................. G05g 1/06
[58] Field of Search...... 74/473 R, 473 P, 523, 552; 280/150 B

[56] References Cited
UNITED STATES PATENTS
| | | | |
|---|---|---|---|
| 2,174,504 | 9/1939 | Cole | 74/473 P |
| 3,561,281 | 2/1971 | Wilfert | 74/473 R |
| 3,596,532 | 8/1971 | Wilfert | 74/552 |

*Primary Examiner*—Allan D. Herrmann
*Attorney, Agent, or Firm*—Craig and Antonelli

[57] ABSTRACT

A shifting lever for a motor vehicle transmission which essentially consists of an elastic synthetic material and is reinforced by at least one insert of spring steel.

5 Claims, 12 Drawing Figures

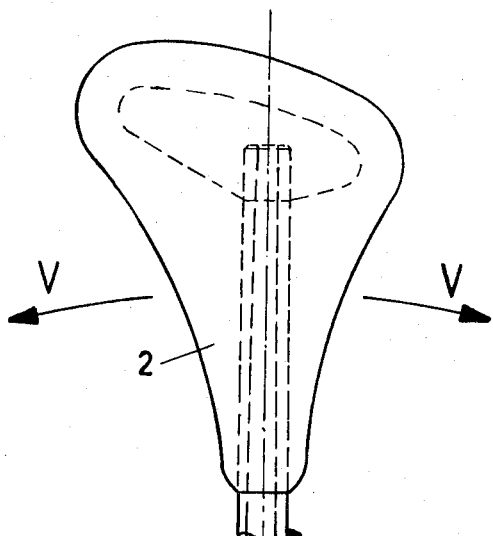
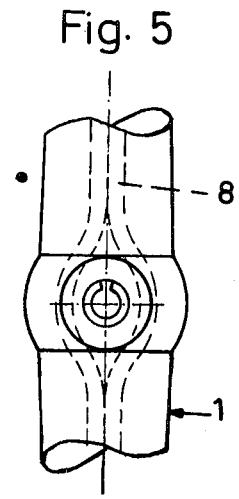
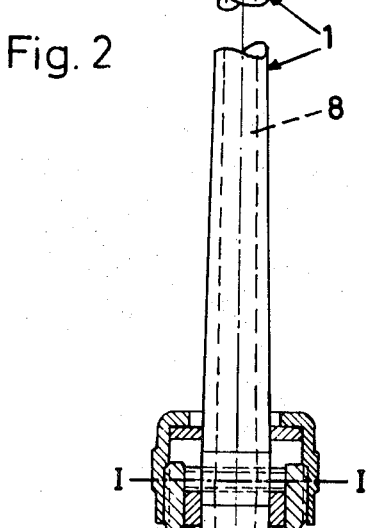
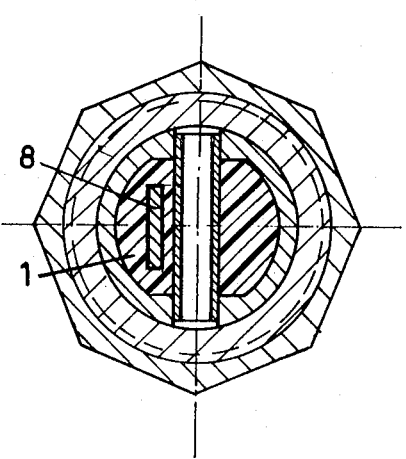
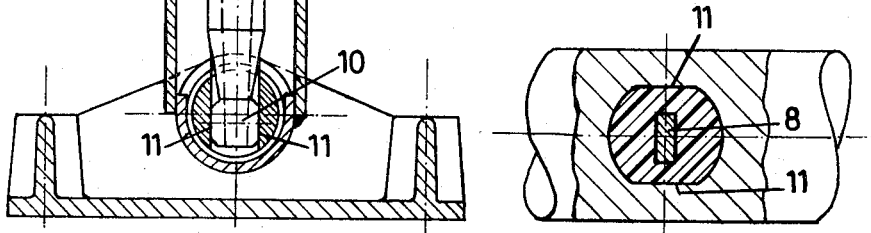

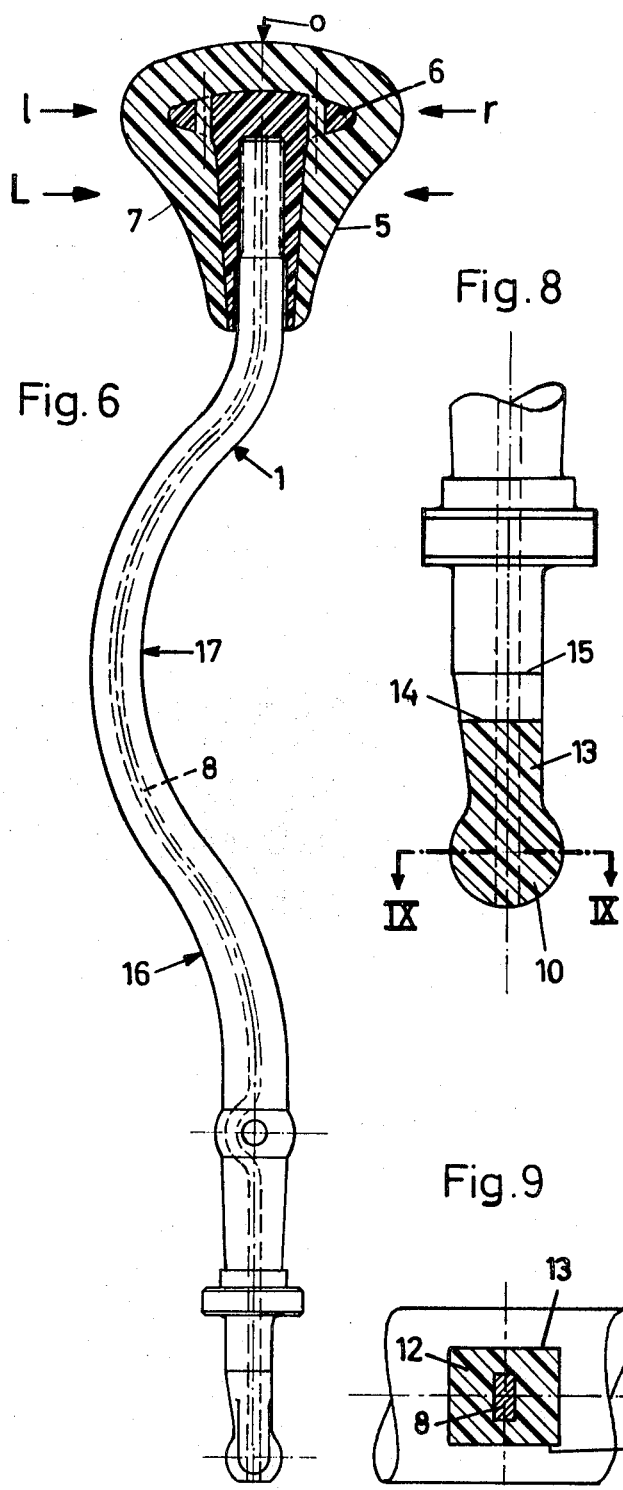

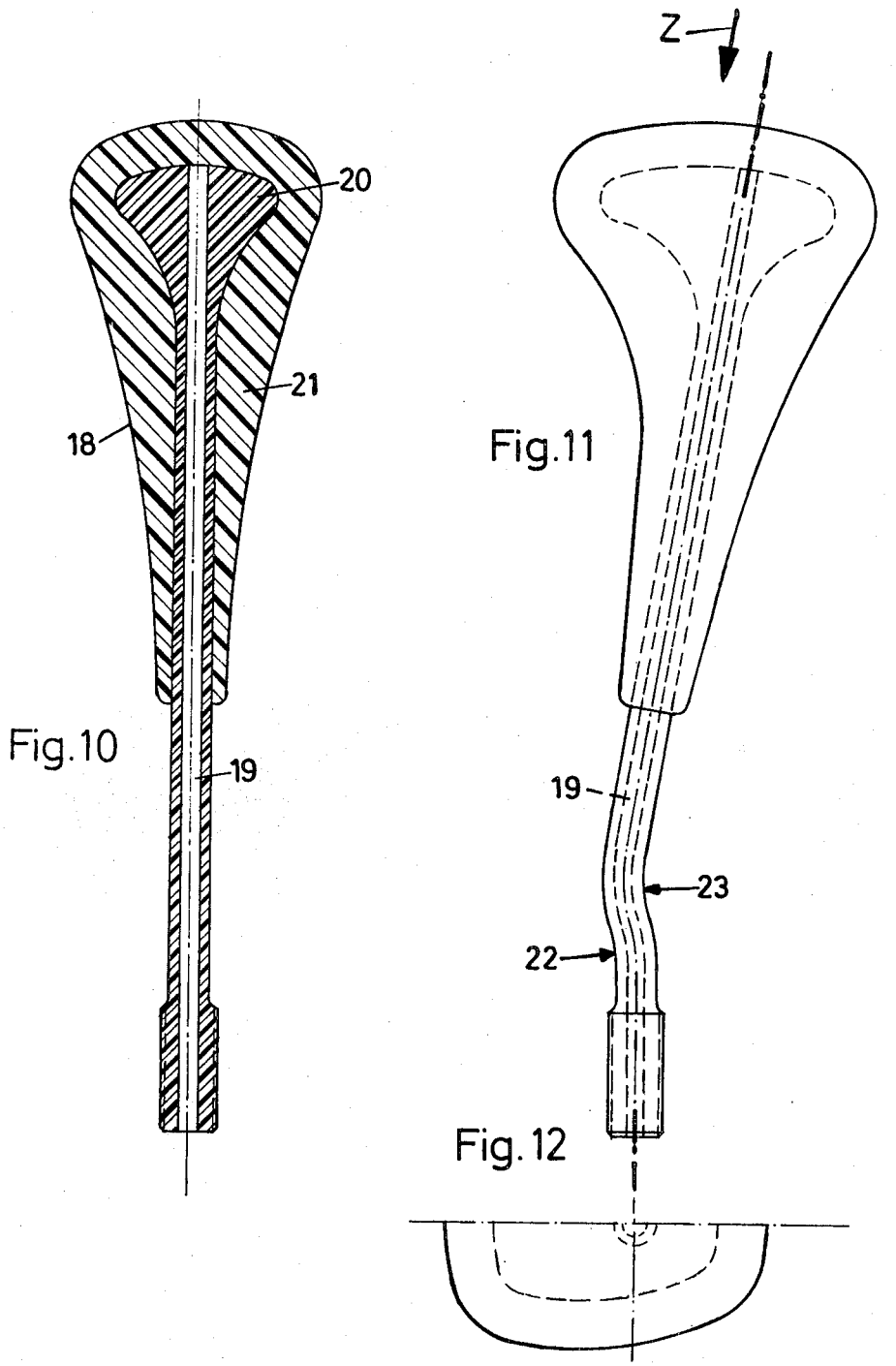

SHIFTING LEVER FOR THE TRANSMISSION OF MOTOR VEHICLES

The present invention relates to a shifting lever for transmissions of motor vehicles which is so constructed that in case of accidents the danger of an injury to vehicle passengers is at least far-reachingly reduced.

It is known that considerable internal injuries of vehicle passengers are caused in particular by the customary center floor-type shifting levers of motor vehicles which are made, for example, from round steel bars.

The present invention is concerned with the task to avoid this disadvantage of known shifting levers and to provide a shifting lever which is not only far-reachingly safer in case of accidents but therebeyond can be manufactured still considerably more inexpensively than the prior art shifting levers, customarily used in the automotive industry.

Accordingly, a shifting lever for the transmission of motor vehicles is proposed which according to the present invention consists of an elastic synthetic material, for example, of a synthetic resinous material of any known type and which is reinforced by at least one insert made from spring steel.

A shifting lever which is constructed in such a manner can elastically give way to a vehicle passenger impinging thereon and thus quite considerably reduces the danger of an injury of the vehicle passengers compared to the hitherto customary rigid shifting levers. Therebeyond such a shifting lever, which can be manufactured in accordance with known plastic injection molding processes, offers the advantage that in its manufacture hardly any finishing operations are necessary which results in a considerable price advantage compared to the hitherto customary shifting levers.

According to a particularly advantageous embodiment of the present invention, the reinforcing core is formed by a flat profile which is so arranged that the shifting lever receives its greatest rigidity in the direction of its greatest load during the shifting of the transmission, which means that in case of a floor-type center shifting lever the greatest rigidity is required in the vehicle longitudinal direction.

An advantageous further developement of a shifting lever in accordance with the present invention resides in that a shifting lever is so curved that an intentional bending place is formed which becomes effective in case of a strong axial pressure load, for example, during an impact of a vehicle passenger on the shifting lever from above.

It is also within the purview of the present invention that, for example, with selecting levers for an automatic floor-type center shifting mechanism, which are not subjected to any high loads and stresses during the shifting of the transmission, the spring steel core may consist of round material.

Accordingly, it is an object of the present invention to provide a shifting lever for the transmission of motor vehicles which avoids by simple means the aforementioned shortcomings and drawbacks encountered in the prior art.

Another object of the present invention resides in a shifting lever for motor vehicle transmissions which considerably reduces the danger of internal injuries of the vehicle passengers as compared to the hitherto customary shifting lever.

A further object of the present invention resides in a floor-type center shifting lever for motor vehicle transmissions which considerably increases the passenger safety, yet entails also considerable advantages as regards manufacturing cost.

These and further objects, features and advantages of the present invention will become more apparent from the following description when taken in connection with the accompanying drawing which shows, for purposes of illustration only, several embodiments in accordance with the present invention, and wherein FIG. 1 is a partial cross sectional view of an installed shifting lever with a knob made from foamed material, as viewed in the shifting direction;

FIG. 2 is a left side view of the shifting lever of FIG. 1;

FIG. 3 is a cross sectional view, on an enlarged scale, taken along line III—III of FIG. 1;

FIG. 4 is a cross sectional view, on an enlarged scale, taken along line IV–IV of FIG. 1;

FIG. 5 is an enlarged elevational view of a shifting lever with two inlayed spring steel bands, within the area of the cross section III—III of FIG. 1;

FIG. 6 is a modified embodiment of a shifting lever as viewed in the shifting direction with a screwed-in knob surrounded by foamed plastic material;

FIG. 7 is a partial left side view of the shifting lever of FIG. 6;

FIG. 8 is an enlarged view of the lower portion of the shifting lever of FIGS. 1, 2, 6 an 7 in a modified construction;

FIG. 9 is a cross sectional view taken along line IX—IX of FIG. 8;

FIG. 10 is a cross sectional view of a selecting lever for an automatic transmission in accordance with the present invention;

FIG. 11 is a side elevational view of the shifting lever of FIG. 10, and

FIG. 12 is a partial top plan view of the shifting lever according to FIG. 11, as viewed in the direction of arrow Z.

Figure 1:
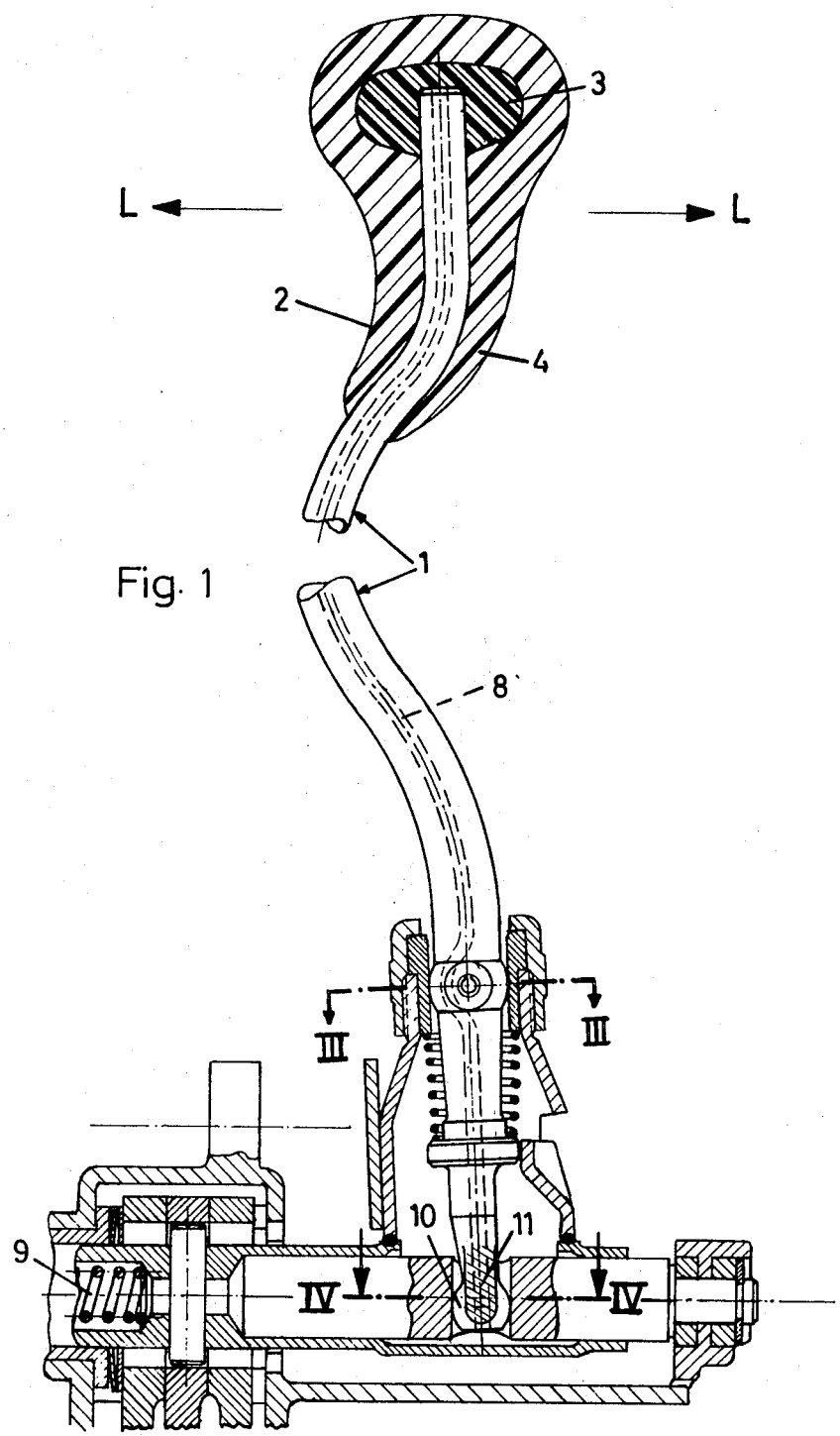

Referring now to the drawing wherein like reference numerals are used throughout the various views to designate like parts, and more particularly to FIG. 1, one embodiment of a shifting lever 1 consisting of synthetic material, such as of any suitable plastic material and reinforced with spring band steel is illustrated in this figure in the shifting direction and in the installed condition thereof, whereby the knob 2 is so connected with the shifting lever 1 that the core portion 3 consisting of rigid plastic material is pressed or glued onto the shank of the shifting lever 1 and then, to form knob portion 4, is foamed about with an elastic foamed material of any known type. Suitable synthetic resinous materials of known, commercially available type with appropriate characteristics may be used thereby for the shifting lever 1, the core portion 3 as well as the knob portion 4.

It is also possible as illustrated in FIG. 5 to provide the core of the shifting lever 1 with a pair of inserts 8 of high-strength spring band steel.

FIG. 6 illustrates another embodiment of a knob 5 which is detachably connected with the shifting lever 1. With the detachable knob 5 the core 6 also consists of a relatively hard plastic material whereas the outer portion 7 also consists of an elastic plastic material.

It is thereby to be made clear from FIG. 1 that it is possible to modify a shifting lever consisting heretofore of steel in such a manner that an insert 8 of high-quality, high-strength spring band steel is utilized in the core of the shifting lever 1, which imparts to the shifting lever 1 sufficient rigidity and strength in the shifting direction. The reinforcement 8 may be so constructed that it possesses its largest bending moment in the shifting direction "V" (FIG. 2) at the endangered cross section I—I and more particularly in that it has its largest width at this location.

In idling in the direction "L" (FIG. 1) the shifting lever 1 only has to overcome the spring force of the compression spring 9, which the ball 10 loaded thereby is able to withstand very readily. However, it is different with the load of the cross-hatched surface 11 of the flattened ball 10 in the shifting direction "V" (FIG. 2). Larger forces have to be transmitted thereby, whence these surfaces 11 were quite considerably enlarged compared to the customary steel shifting levers without increasing thereby the manufacturing costs. The surfaces 11 could still be further enlarged, which is shown, for example, in the embodiment of FIG. 8 and FIG. 9. In lieu of the ball 10, also a cylinder 12 could be used in its place, possibly slightly curved, similar to the rollers in barrel-shaped roller bearings. The thereby resulting cross-hatched surfaces 13 extend parallel up to the line 14 (FIG. 8), then conically up to the line 15 and then again parallel up to the collar which is of advantage for the reinforcement of the shifting lever 1 within this area.

The possible impact forces from the left side ($l$), from the right side ($r$) and from above ($o$) are illustrated in FIG. 6, which the shifting lever 1 reinforced with spring band steel absorbs in case of accidents by the intentional bending places 16 and 17 without thereby causing more serious injuries to the vehicle passengers.

In FIG. 10, a spring-steel reinforced plastic selector lever 18 for an automatic center change-speed transmission is illustrated. This lever 18 is only slightly stressed during the shifting or preselection of the speeds, whence it is particularly suited for a spring-steel-reinforced plastic construction. With this embodiment preferably a round spring steel 19 may be used as spring steel inlay or core during the injection process.

The immediate casing or liner 20 of the spring steel 19 consists of a relatively hard plastic material whereas the outer casing or the knob 21 consists of an elastic plastic material. The intentional bending places 22 and 23 may also be constructed analogously to the embodiments of FIGS. 1 and 6.

Any suitable plastic materials may be used with the present invention possessing the desired properties, as described above, as regards relative hardness and/or elasticity. Furthermore, conventional injection molding or other spray molding processes may be used with the present invention.

Thus, while I have described several embodiments in accordance with the present invention, it is understood the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. A shifting lever for the transmission of motor vehicles, comprising: a shifting lever consisting of an elastic synthetic material, at least one insert of spring steel disposed in said shifting lever for reinforcing said lever, said shifting lever at its installation in the motor vehicle having its largest rigidity in the shifting direction, at least one curved portion provided on said shifting lever forming intentional bending places which bend upon the application of relatively stronger axial pressure loads on said shifting lever, a core portion of relatively hard material provided on the upper end of said shifting lever, and a knob of relatively elastic plastic material surrounding said core portion.

2. A shifting lever according to claim 1, wherein said insert is a flat profile of spring steel.

3. A shifting lever according to claim 1, wherein said core portion is detachably connected with said shifting lever.

4. A shifting lever according to claim 1, wherein said insert is a round profile of spring steel.

5. A shifting lever according to claim 1, wherein said shifting lever is reinforced by at least a pair of inserts of spring steel.

* * * * *